UNITED STATES PATENT OFFICE.

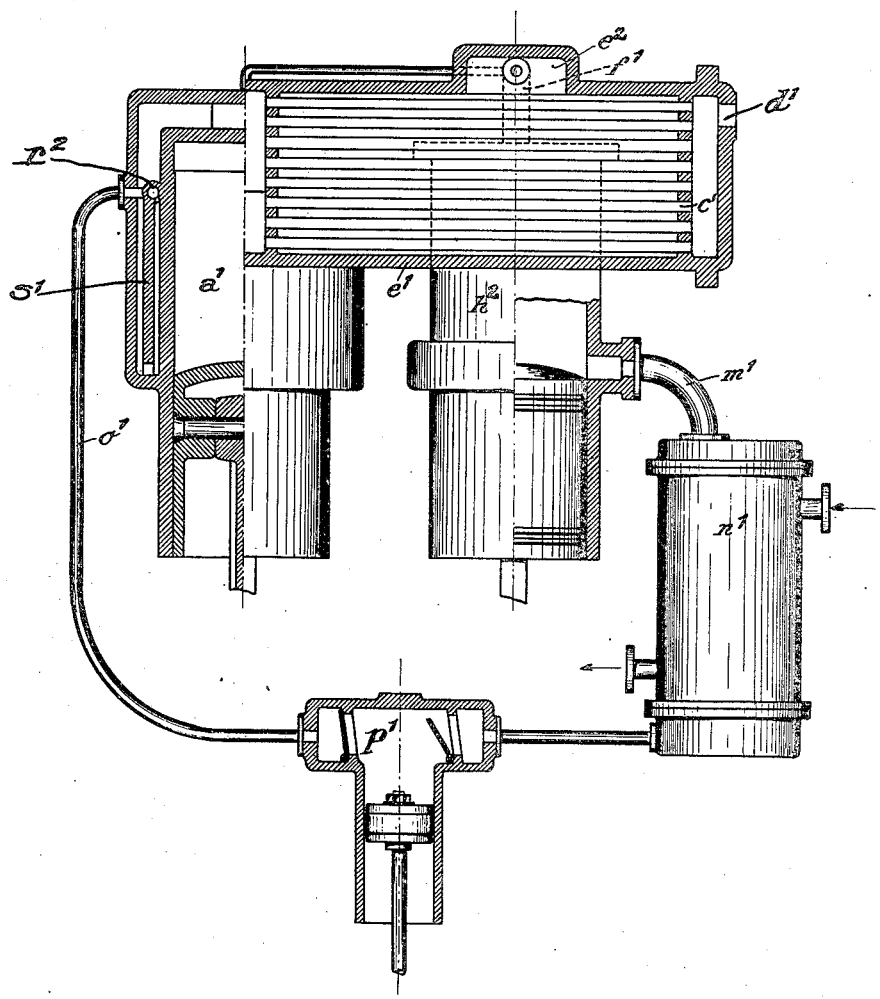

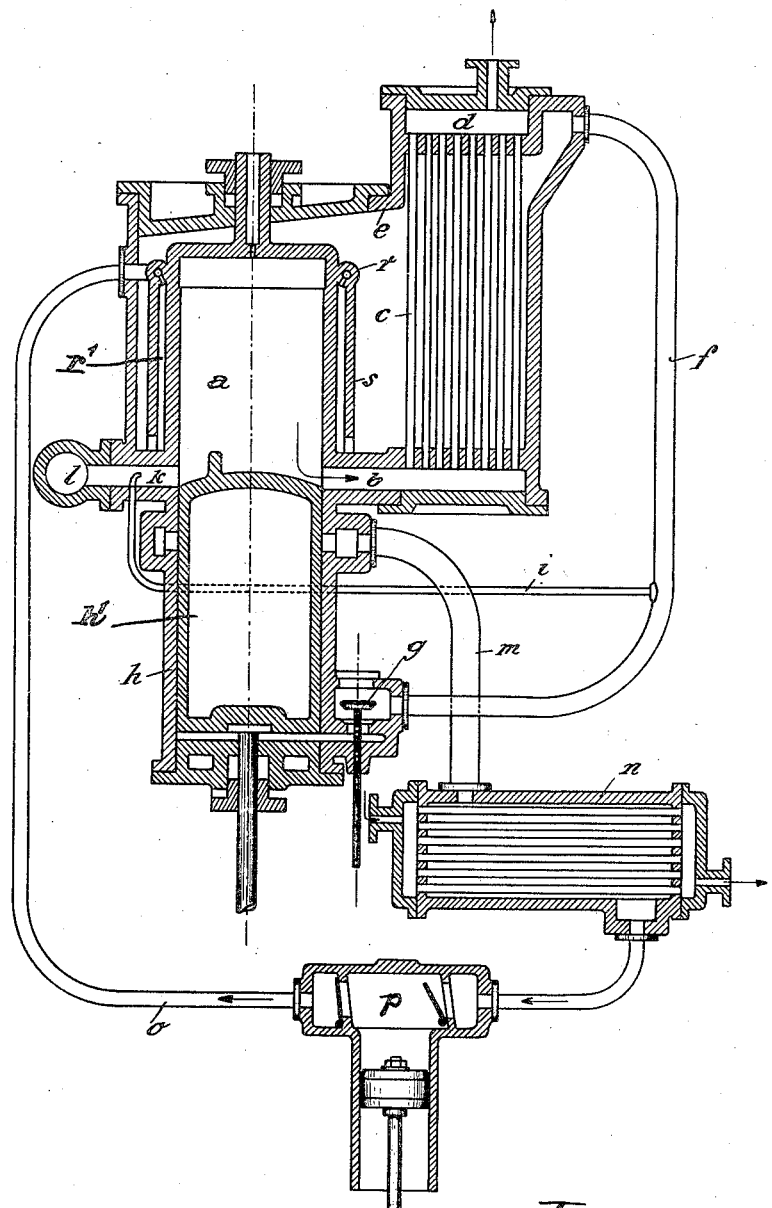

ALVIS KASCHTOFSKY, OF PRAGUE-SMICHOV, CZECHO-SLOVAKIA, ASSIGNOR OF ONE-HALF TO R. A. FENZL, OF HARRIS COUNTY, TEXAS.

COMBUSTION MOTOR.

1,427,395.

Specification of Letters Patent. Patented Aug. 29, 1922.

Application filed October 28, 1920. Serial No. 420,221.

*To all whom it may concern:*

Be it known that I, ALVIS KASCHTOFSKY, citizen of Czecho-Slovakia, residing at Tremyslava 6, Prague-Smichov, Czecho-Slovakia, have invented new and useful Improvements in Combustion Motors, of which the following is a specification.

The invention relates to a process and an apparatus for the utilization of the waste heat of combustion engines, and consists chiefly in the quantity of heat contained in the waste gases of combustion engines being utilized for evaporating the fuel or driving medium which is caused by expansion to operate a steam or expansion engine. After the vaporized fuel has been used to operate the expansion engine, the fuel is condensed and returned to its reservoir.

Two constructions of an apparatus for carrying out the said process are illustrated by way of example in the accompanying drawing.

Figure 1 shows one construction in longitudinal section.

Figures 2 and 3 show the second construction in longitudinal section and in cross-section.

Figure 3:
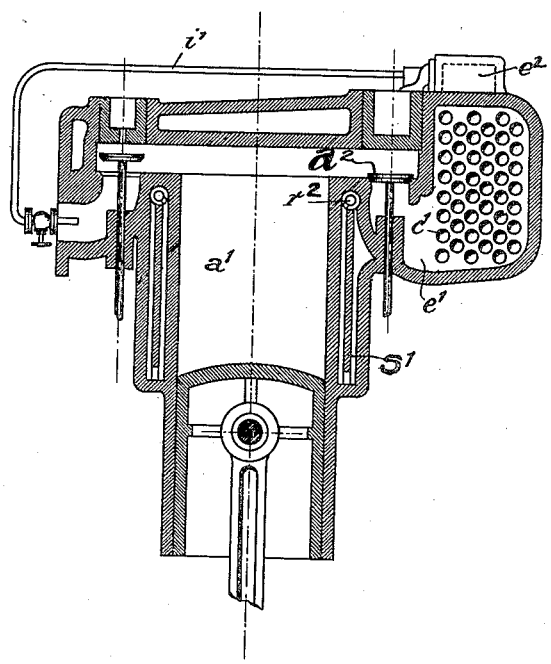

In the construction illustrated in Figure 1, the hot combustion gases escaping from the combustion cylinder $a$ pass through the pipe $b$ into the heating pipe system $c$ and thence through a discharge chamber $d$ into the open. The heating pipe system $c$ is built into the driving medium or fuel tank $e$. The driving medium or fuel is vaporized, by the escaping hot combustion gases and passes through the pipe $f$ and the controlled inlet valve $g$ into the cylinder $h$ where its expansion power is used to drive the piston $h'$. A pipe $i$ branching off from the vapor pipe $f$ leads a portion of the vaporized driving medium or fuel to the inlet conduit $k$ of the combustion cylinder $a$, to which the necessary combustion air is supplied at the same time through the pipe $l$. The fuel vapors introduced into the cylinder $h$ escape after expansion through the pipe $m$ into the condenser $n$. The condensate is returned in a suitable manner, for instance by means of a pump $p$, through the pipe $c$ back to the driving medium or fuel tank $e$. The pipe $o$ opens preferably into an annular pipe $r$ from which the condensate passes through openings into the hollow space $r'$ between the combustion cylinder $a$ and the jacket $s$. The condensate trickling down along the cylinder wall, produces an effective cooling of the combustion cylinder.

The construction shown in Figures 2 and 3 is substantially the same as that just described. It differs from the latter chiefly by the combustion gases and vapor acting on different pistons.

The combustion gases pass from the combustion cylinder $a'$ through a controlled valve $a^2$ into the heating pipe system $c'$ and thence through the opening $d'$ into the open. The heating pipe system $c'$ is mounted in the driving medium or fuel tank $e'$. The vaporized driving medium or fuel collects in the vapor dome $e^2$ and passes through the pipe $f'$ into the expansion cylinder $h^2$, from the latter through the pipe $m'$ into the condenser $n'$ and the condensate through the pipe $o'$ by means of a pump $p'$ back into the driving medium or fuel tank $e'$. Here also there is provided a ring $r^2$ and a cylinder jacket $s'$, between which the condensate trickles down along the cylinder and cools the latter whilst becoming heated itself. The supply of the driving medium or fuel to the combustion cylinder is effected by means of a pipe $i'$ connected to the vapor pipe $f'$.

What I claim as my invention and desire to secure by Letters Patent is:—

1. A method of utilizing the waste heat of internal combustion engines consisting in vaporizing the engine fuel prior to its introduction into the engine, utilizing the expansive power of the vaporized fuel to drive an expansion engine, condensing the fuel after its passage through the expansion engine, and introducing a portion of said fuel while in its vaporized condition into the internal combustion engine.

2. The combination with an internal combustion engine having an inlet passageway, of means for utilizing the waste heat of the engine including a fuel tank heated by the waste heat from the engine, an expansion engine, means for conveying vaporized fuel from the tank to said expansion engine, means for returning the fuel from the expansion engine to the tank, and a conduit for leading a portion of the vaporized fuel from the conveying means to the internal combustion engine inlet passageway.

3. In combination, an internal combustion engine having a cylinder, an exhaust gas passageway for the cylinder, a fuel conduit passing through said passageway for causing the fuel to be vaporized by the exhaust gases, an expansion cylinder having a piston, means for leading vaporized fuel from the conduit to said expansion cylinder, a condenser for condensing the fuel passing through the expansion cylinder, a fuel tank containing fuel for the internal combustion engine, means for conveying the fuel from the condenser to said tank, and a conduit for leading a portion of the vaporized fuel from the first mentioned conduit to the internal combustion engine cylinder.

4. A method of utilizing the waste heat and cooling an internal combustion engine consisting in utilizing the waste heat to vaporize the internal combustion engine fuel, conveying the vaporized fuel to an expansion engine, leading a portion of the vaporized fuel to the inlet passageway of the internal combustion engine, utilizing the remaining portion of the vaporized fuel to drive said expansion engine, condensing the vaporized portion of the fuel which is utilized to drive the expansion engine, and employing the condensed fuel to cool the internal combustion engines.

In testimony whereof I have signed my name to this specification in the presence of two subscribing witnesses.

ING. ALVIS KASCHTOFSKY.

Witnesses:
M. Z. C. ERNST PLEISS,
OTTO U. HELRIK.